United States Patent
Lee et al.

(10) Patent No.: US 9,674,905 B2
(45) Date of Patent: Jun. 6, 2017

(54) LIGHT SOURCE DRIVING APPARATUS FOR CONTROLLING THE OPERATING MODE OF A BACKLIGHT IN RESPONSE TO CHANGES IN THE DROPOUT VOLTAGE OF THE CURRENT CONTROL TRANSISTOR

(71) Applicant: SAMSUNG ELECTRONICS CO., LTD., Suwon-si (KR)

(72) Inventors: Jin-hyung Lee, Anyang-si (KR); Youn-seung Lee, Seoul (KR); Gil-yong Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 14/325,840

(22) Filed: Jul. 8, 2014

(65) Prior Publication Data
US 2015/0130861 A1 May 14, 2015

(30) Foreign Application Priority Data
Nov. 12, 2013 (KR) .................... 10-2013-0137025

(51) Int. Cl.
*H05B 33/08* (2006.01)
*G09G 3/34* (2006.01)
*G09G 3/3283* (2016.01)

(52) U.S. Cl.
CPC ....... *H05B 33/0815* (2013.01); *G09G 3/3283* (2013.01); *G09G 3/3406* (2013.01); *H05B 33/0812* (2013.01); *H05B 33/0827* (2013.01); *Y02B 20/345* (2013.01); *Y02B 20/347* (2013.01)

(58) Field of Classification Search
CPC .............. G09G 3/3406; G09G 3/3413; G09G 2320/0626–2320/0653; H05B 33/08–33/0893; Y02B 20/34–20/36
See application file for complete search history.

(56) References Cited

U.S. PATENT DOCUMENTS

| | | | |
|---|---|---|---|
| 8,334,662 B2 | 12/2012 | Jin et al. | |
| 2007/0195025 A1* | 8/2007 | Korcharz | H05B 33/0893 345/82 |
| 2009/0251071 A1* | 10/2009 | Gater | G09G 3/342 315/297 |
| 2009/0302776 A1* | 12/2009 | Szczeszynski | H05B 33/0815 315/246 |
| 2010/0301760 A1* | 12/2010 | Liu | H05B 33/0827 315/186 |
| 2011/0062872 A1* | 3/2011 | Jin | H05B 33/0818 315/122 |
| 2012/0025716 A1* | 2/2012 | Nakanishi | G09G 3/3406 315/152 |
| 2013/0057166 A1* | 3/2013 | Gao | G09G 3/342 315/192 |

* cited by examiner

*Primary Examiner* — Chanh Nguyen
*Assistant Examiner* — Navin Lingaraju
(74) *Attorney, Agent, or Firm* — Sughrue Mion, PLLC

(57) ABSTRACT

A display apparatus including: a display; a driver including an amplifier configured to detect a current of the display and to generate a constant current control signal, and a transistor configured to adjust the current supplied to the display in accordance an output voltage of the amplifier; and a controller configured to monitor the current of the display and a dropout voltage of the transistor, and control the amplifier so that a pulse width modulation (PWM) duty ratio is decreased in response to the dropout voltage being equal to or higher than a reference voltage.

27 Claims, 8 Drawing Sheets

LIGHT SOURCE DRIVING APPARATUS FOR CONTROLLING THE OPERATING MODE OF A BACKLIGHT IN RESPONSE TO CHANGES IN THE DROPOUT VOLTAGE OF THE CURRENT CONTROL TRANSISTOR

CROSS-REFERENCE TO RELATED APPLICATION

This application claims priority from Korean Patent Application No. 10-2013-0137025, filed on Nov. 12, 2013 in the Korean Intellectual Property Office, the disclosure of which is incorporated herein by reference in its entirety.

BACKGROUND

Field

Apparatuses and methods consistent with exemplary embodiments relate to a display apparatus, a light source driving apparatus and a driving method thereof, and more particularly a display apparatus, a light source driving apparatus and a driving method thereof, in which a driving current of a display is controlled.

Description of the Related Art

A display apparatus includes a driving section, i.e., a driver, for controlling a constant current for operating a light source such as a light emitting diode (LED), and the driver performs constant current control and brightness control of the light source.

A driving method of the driver is classified into at least a linear type, a switching type using a boost converter or a buck converter, etc. The linear type includes a bipolar transistor or a metal oxide field effect transistor (MOSFET) and a constant current control circuit. The boost converter or the buck converter used in the switching type has a power stage that includes a control circuit for applying pulse width modulation (PWM) or pulse frequency modulation (PFM) to an input voltage, a switching diode, a capacitor, an inductor, etc.

Although the linear type has been generally used in a mobile device or the like because it has a simple control circuit and does not need an inductor, diode, capacitor, and other elements of the switching type, the linear type disadvantageously has a lower efficiency than the switching type. On the other hand, the switching type has a high efficiency but has a disadvantage that the boost converter needs separate dimming software or the buck converter needs a large secondary winding number and a high voltage.

FIG. 1 is a view showing operations of a linear type driver in the related art.

As shown in FIG. 1, the conventional linear type driver performs the constant current control by operating a base/gate of the transistor in an active region as a voltage controlled current source (VCCS) that acts like a variable resistor in accordance with levels of a base current/gate voltage. Here, loss occurs due to a dropout voltage generated between opposite terminals of the transistor in accordance with an input voltage at the constant current control.

As shown in FIG. 1 a display apparatus using LEDs as a light source may have a structure where a plurality of channels 11 and 12, each having a plurality of LEDs connected in series, are connected in parallel. FIG. 1 shows an example where there are two LED bars 11 and 12 corresponding to channels, each of the channels 11 and 12 including eighteen LEDs, and a current of 0.45 A and a voltage of 64V are applied thereto.

In the linear type, if a predetermined voltage (e.g., 64V) is supplied to the plurality of LED channels 11 and 12, a difference in forward voltage drop (hereinafter, referred to as "VF") may exist among the LEDs. For example, the VF of a single LED may be between 2.7V to 3.6V.

Specifically, referring to FIG. 1, the VF may differ from the minimum of 49V(VF(MIN)*18EA=49V) 11 to the maximum of 63.5V(VF(MAX)*18EA=63.5V) 12 in accordance with the resistance of the LEDs. Therefore, a low voltage 49V is supplied to a channel 11 to which the LED having the low VF is applied, and thus a relatively high voltage 15V is supplied to the linear circuit, thereby causing a power loss (PLOSS) (e.g., 7.218 W) in the linear driver circuit. Accordingly, a dropout voltage of the transistor included in the linear circuit increases and heat is intensively generated, lowering reliability and efficiency.

The linear type LED driver is in high demand because a control circuit is simple. However, as described above, the conventional linear type has problems of low efficiency and power loss caused by the dropout voltage in the constant current control.

Also, in the case of multi-channels as shown in FIG. 1, the loss of the driving circuit may be unbalanced among the LED channels. The VF of the LEDs varies widely and is difficult to be managed during manufacturing. The difference in loss due to the VF among the LED channels similarly varies widely and is difficult to manage in manufacturing a backlight unit, and, therefore, an additional heat-radiating design is needed.

SUMMARY

According to an aspect of an exemplary embodiment, a display apparatus including: a display configured to display an image; a driver including an amplifier configured to detect a current of the display and generates a constant current control signal, and a transistor configured to adjust the current supplied to the display in accordance with output voltages of the amplifier; and a controller configured to monitor the current of the display and a dropout voltage of the transistor, and control the amplifier so that a pulse width modulation (PWM) duty ratio is decreased in response to the dropout voltage is equal to or higher than a reference voltage is provided.

The display apparatus may further include an image processor configured to process an image signal corresponding to the image, and the controller may control an output voltage of the amplifier in accordance with a dimming PWM control signal received from the image processor.

A gate or base voltage of the transistor may be adjusted in accordance with an output voltage of the amplifier.

The controller may control the output voltage of the amplifier so that a constant current can be supplied to the display if the dropout voltage is lower than the reference voltage.

The controller may control a voltage corresponding to a preset current to be supplied to the amplifier based on a monitoring result of the dropout voltage.

The controller may control the output voltage of the amplifier so that an average current of a section where the PWM duty ratio decreases can be equal to an average current of a section where the constant current is supplied.

The controller may control the PWM duty ratio to be fixed if the PWM duty decreases to 50% or lower.

The controller may control the output voltage of the amplifier so that an average current of a section where the PWM duty ratio is fixed can be equal to an average current of a section where the constant current is supplied and a section where the PWM duty ratio decreases.

The display may include a plurality of LED channels, the driver may include a plurality of drivers corresponding to the plurality of LED channels, and the controller may monitor the current and the dropout voltage in accordance with the plurality of LED channels, and control a plurality of amplifiers respectively provided in the plurality of drivers.

According to an aspect of another exemplary embodiment, a driving method of a display apparatus including a display configured to display an image, and a driver including an amplifier configured to detect a current of the display and to generate a constant current control signal, and a transistor configured to adjust the current supplied to the display in accordance with output voltages of the amplifier is provided, the method including: monitoring the current of the display and a dropout voltage of the transistor; and controlling the amplifier so that a pulse width modulation (PWM) duty ratio can decrease if the dropout voltage is equal to or higher than a reference voltage.

The controlling the amplifier so that the PWM duty ratio is decreased may include controlling an output voltage of the amplifier in accordance with a received dimming PWM control signal.

The method may further include adjusting a gate or base voltage of the transistor in accordance with an output voltage of the amplifier.

The method may further include controlling the output voltage of the amplifier so that a constant current can be supplied to the display in response to the dropout voltage being lower than the reference voltage.

The controlling the output of the amplifier so that the constant current can be supplied may include controlling a voltage corresponding to a preset current to be supplied to the amplifier based on a monitoring result of the dropout voltage.

The output voltage of the amplifier may be controlled so that an average current of a section where the PWM duty ratio decreases can be equal to an average current of a section where the constant current is supplied.

The method may further include controlling the PWM duty ratio to be fixed if the PWM duty decreases to 50% or lower.

The output voltage of the amplifier may be controlled so that an average current of a section where the PWM duty ratio is fixed can be equal to an average current of a section where the constant current is supplied and a section where the PWM duty ratio decreases.

According to an aspect of another exemplary embodiment, a light source driving apparatus of a display apparatus including a display is provided, the light source driving apparatus including: an amplifier configured to detect a current of the display and generate a constant current control signal; a transistor configured to adjust the current supplied to the display in accordance with output voltages of the amplifier; and a controller configured to monitor the current of the display and a dropout voltage of the transistor, and control the amplifier so that a pulse width modulation (PWM) duty ratio decreases if the dropout voltage is equal to or higher than a reference voltage.

The controller may control an output voltage of the amplifier in accordance with a dimming PWM control signal received from an exterior.

The controller may control an output voltage of the amplifier so that a constant current can be supplied to the display if the dropout voltage is lower than the reference voltage The controller may control a voltage corresponding to a preset current to be supplied to the amplifier based on a monitoring result of the dropout voltage.

The controller may control the output voltage of the amplifier so that an average current in a section where the PWM duty ratio decreases can be equal to an average current in a section where the constant current is supplied.

The controller may control the PWM duty ratio to be fixed if the PWM duty decreases to 50% or lower.

The controller controls the output voltage of the amplifier so that an average current of a section where the PWM duty ratio is fixed can be equal to an average current of a section where the constant current is supplied and a section where the PWM duty ratio decreases.

According to an aspect of another exemplary embodiment, a driving apparatus of a primary apparatus is provided, the driving apparatus including: an amplifier configured to detect a current of the primary apparatus and generate a current control signal; a transistor configured to adjust the current of the primary apparatus in accordance with the current control signal; and a controller configured to monitor the current of the primary apparatus and a dropout voltage of the transistor, to control a pulse width modulation (PWM) duty ratio of the current control signal, and to control the transistor to adjust, in response to an adjustment of the PWM duty ratio, the current of the primary apparatus in order to maintain a constant average current.

The controller may be further configured to control the PWM duty ratio to be 100% so that a constant current is supplied to the primary apparatus in response to the dropout voltage being lower than a reference voltage.

The controller may be further configured to control the PWM duty ratio to be less than 100% in response to the dropout voltage being greater than or equal to a reference voltage, and to control the transistor to increase the current of the primary apparatus in order to maintain a constant average current.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings.

Figure 2:
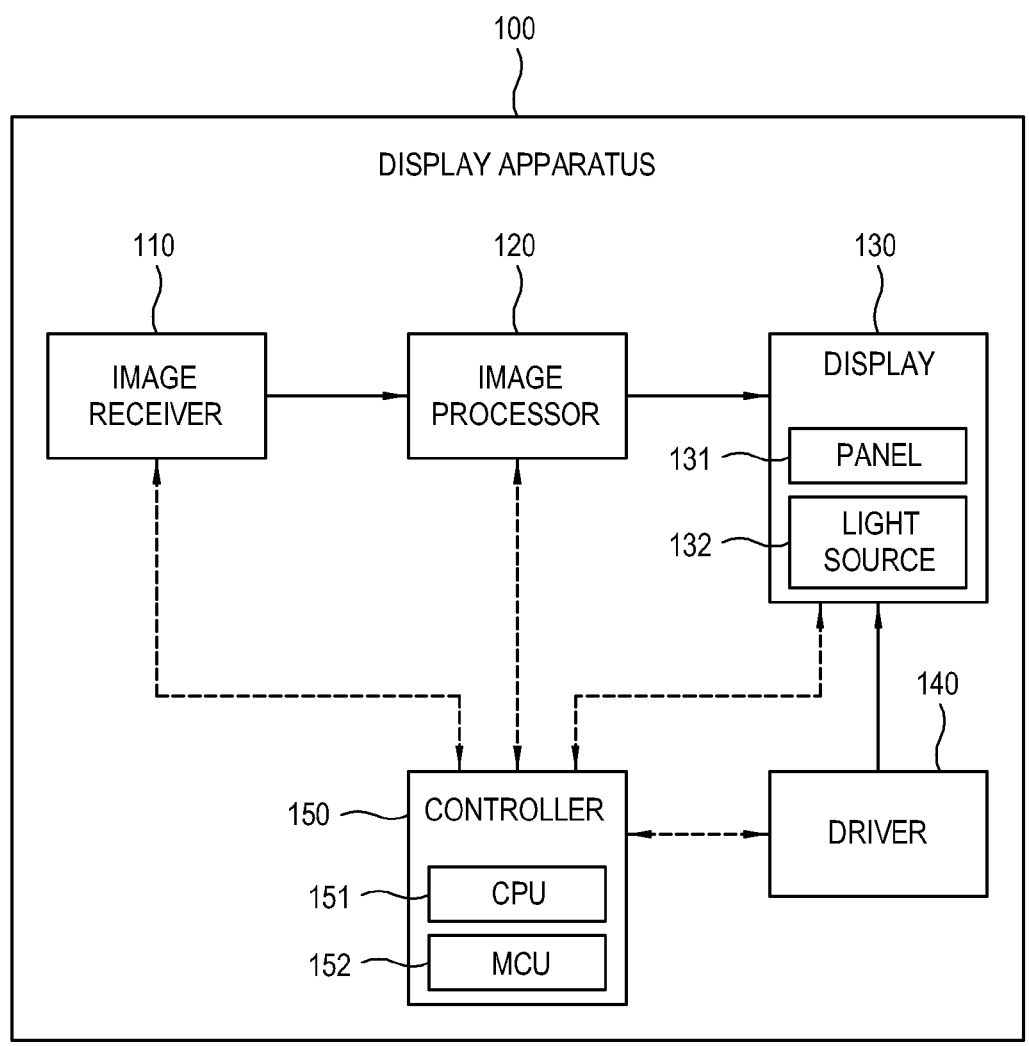
FIG. 2 is a block diagram illustrating a display apparatus according to an exemplary embodiment.

FIG. 2 is a block diagram illustrating a display apparatus 100 according to an exemplary embodiment;

As shown in FIG. 2, a display apparatus 100 processes an image signal received from an external image source (not shown) through preset image processing and displays it as an image.

In this exemplary embodiment, the display apparatus 100 will be described as a television (TV) that processes a broadcasting image based on a broadcasting signal/broadcasting information/broadcasting data received from a transmitter of a broadcasting station, but this is merely an example. As alternative non-limiting examples, the display apparatus 100 may be applicable to various examples such as a monitor, a smartphone, or the like capable, of processing an image.

Also, the kind of images displayable on the display apparatus 100 is not limited to the broadcasting image. For example, the display apparatus 100 may process and display an image such as a moving image, a still image, an application, an on-screen display (OSD), a graphic user interface (GUI) for controlling various operations, etc., based on a signal/data received from various external and internal image sources (not shown).

According to an exemplary embodiment, the display apparatus 100 may be achieved by a smart TV. The smart TV can receive and display a broadcasting signal in real time, function as a web browser so that various contents can be searched for and viewed through the Internet while displaying the broadcasting signal in real time, and thus providing convenient user environments. Also, the smart TV includes an open software platform to provide a user with an interactive service. Thus, the smart TV can provide a user with varied content through the open software platform, for example, an application offering a predetermined service. Such an application is an application program capable of offering various kinds of services, and may for example include applications offering services such as social network service (SNS), finance, news, weather, a map, music, a movie, a game, an electronic book, etc. Besides, the display apparatus 100 according to an exemplary embodiment may be achieved by a smart device provided with a display, such as a smart phone, a tablet PC, etc.

As shown in FIG. 2, the display apparatus 100 includes an image receiver 110 which receives an image signal, an image processor 120 which processes the image signal received by the image receiver 110, a display 130 which displays the image signal processed by the image processor 120, a driver 140 which drives the display 130, and a controller 150 which controls operations of general elements in the display apparatus 100.

The image receiver 110 receives an image signal and transmits it to the image processor 120. The image receiver 110 may be variously achieved corresponding to formats of the received image signal and types of the display apparatus 100. For example, the image receiver 110 may receive a radio frequency (RF) signal from a broadcasting station (not shown) through wireless communication, or receive an image signal through wired communication based on standards such as composite video, component video, super video, Syndicat des Constructeurs d'Appareils Radiorécepteurs et Téléviseurs (SCART), high definition multimedia interface (HDMI), etc. If the image signal is a broadcasting signal, the image receiver 110 may include a tuner to be tuned to a channel for the broadcasting signal.

Also, the image signal may be received from an external device. For example, the image signal may be input from the external device such as a personal computer (PC), an audio/video device, a smart phone, a smart pad, etc. Also, the image signal may be based on data received through the Internet or another network. In this case, the display apparatus 100 may include a communicator (not shown) that performs communication through the network. Also, the image signal may be based on data stored in a flash memory, a hard disk or other nonvolatile storage (not shown). The storage may be provided inside or outside the display apparatus 100. If the storage is provided outside the display apparatus 100, the display apparatus 100 may further include a connector (not shown) to which the storage is connected.

The image processor 120 performs a variety of image processing previously set with respect to the image signal. The image processor 120 outputs the processed image signal to the display 130 so that an image can be displayed on the display 130.

There is no limit to the kind of image processing performed in the image processor 120. For example, the image processing may include decoding corresponding to various image formats, de-interlacing, frame refresh rate conversion, scaling, noise reduction for improving image qualities, detail enhancement, line scanning, etc.

The image processor 120 may be achieved by an individual group capable of independently performing such respective processes, or a system-on-chip where various functions are integrated. For example, the image processor 120 may be achieved by a video board with circuit elements, such as various chipsets (not shown) for performing the processes, a memory (not shown), electronic parts (not shown), wiring (not shown), etc., mounted on a printed circuit board (PCB). In the display apparatus 100 according to an exemplary embodiment, the image receiver 110, the image processor 120 and the controller 150 may be provided on a single video board. Of course, this is only a non-limiting example. Alternatively, the image receiver 110, the image processor 120 and the controller 150 may be respectively provided on a plurality of printed circuit boards connected for communication with one another. The video board may be accommodated in a casing.

The display 130 displays an image based on the image signal processed by the image processor 120. The display 130 may be achieved by various flat panel displays (FPD), such as liquid crystal, plasma, a light-emitting diode (LED), an organic light-emitting diode (OLED), a surface-conduction electron-emitter, a carbon nano-tube, nano-crystal, etc., but not limited thereto.

The display 130 may include an additional element in accordance with its types. For example, the display 130 may include a panel 131 for displaying an image, and if the display 130 is achieved by liquid crystal or a light emitting diode (LED), a light source 132 (hereinafter, referred to as a "backlight unit") may be additionally provided for emitting light to the panel 131. The light source 132 may include an edge type to be arranged in at least one edge of the panel 131 of the display 130, and a direct type to be arranged in the back of the panel 131. In this exemplary embodiment, the backlight unit 132 is achieved by an edge type LED and provides LED channels 31 and 32 including the LEDs connected in series and arranged in the opposite edges of the panel 131, but not limited thereto.

The driver 140 drives the display 130. The driver 140 may be provided in the form of an independent printed circuit board (PCB) with at least one circuit element. Alternatively, the driver 140 may be integrated into the display 130. For example, the light source 132 and the driver 140 may be provided as a single device. The driver 140 may control a current so that the light source of the display 130, for example, the backlight unit such as the LEDs can emit a desired quantity of light. Although as illustrated, the driver 140 drives a light source of a display 140, this is merely an example. The driver 140 may be used to drive power to different primary apparatuses, such as other circuit elements or non-display devices, as needed.

In this exemplary embodiment, the display 130 is achieved by an LED type, and the driver 140 is an LED driver, but not limited thereto. For example, the light source 132 may include a backlight unit for a liquid crystal display (LCD), or a light emitting cell for an organic light emitting diode (OLED). If the panel 131 is achieved by the OLED, the driver 140 may control a current supplied to each light emitting cell so that the light emitting cell in the panel 131 can emit a desired quantity of light.

According to an exemplary embodiment, if the light source 132 includes the plurality of LED channels 31 and 32, the drivers 41 and 42 may be separately provided corresponding to the LED channels 31 and 32, respectively. The controller 150 includes a central processing unit (CPU) 151, and controls various elements of the display apparatus 100. For example, the CPU 151 controls the image processing performed by the image processor 120, and performs a control operation corresponding to a command received from a remote controller thereby controlling the general operations of the display apparatus 100.

The exemplary embodiment of FIG. 2 shows an example that the controller 150 includes a separate micro controller unit (MCU) for controlling the driver 140. The MCU 152 may control the driver 140 in accordance with a dimming pulse width modulation (PWM) control signal received from an exterior source. The PWM control signal may correspond to an image signal.

FIG. 2 shows an example that the separate MCU 152 is provided to control the driver 140, but exemplary embodiments are not limited thereto. Alternatively, the CPU 151 may control the driver 140 to drive the display 130 in response to the image signal processed by the image processor 120. Alternatively, the MCU 152 may be provided in the driver 140, that is, the light source driving apparatus.

Figure 4:
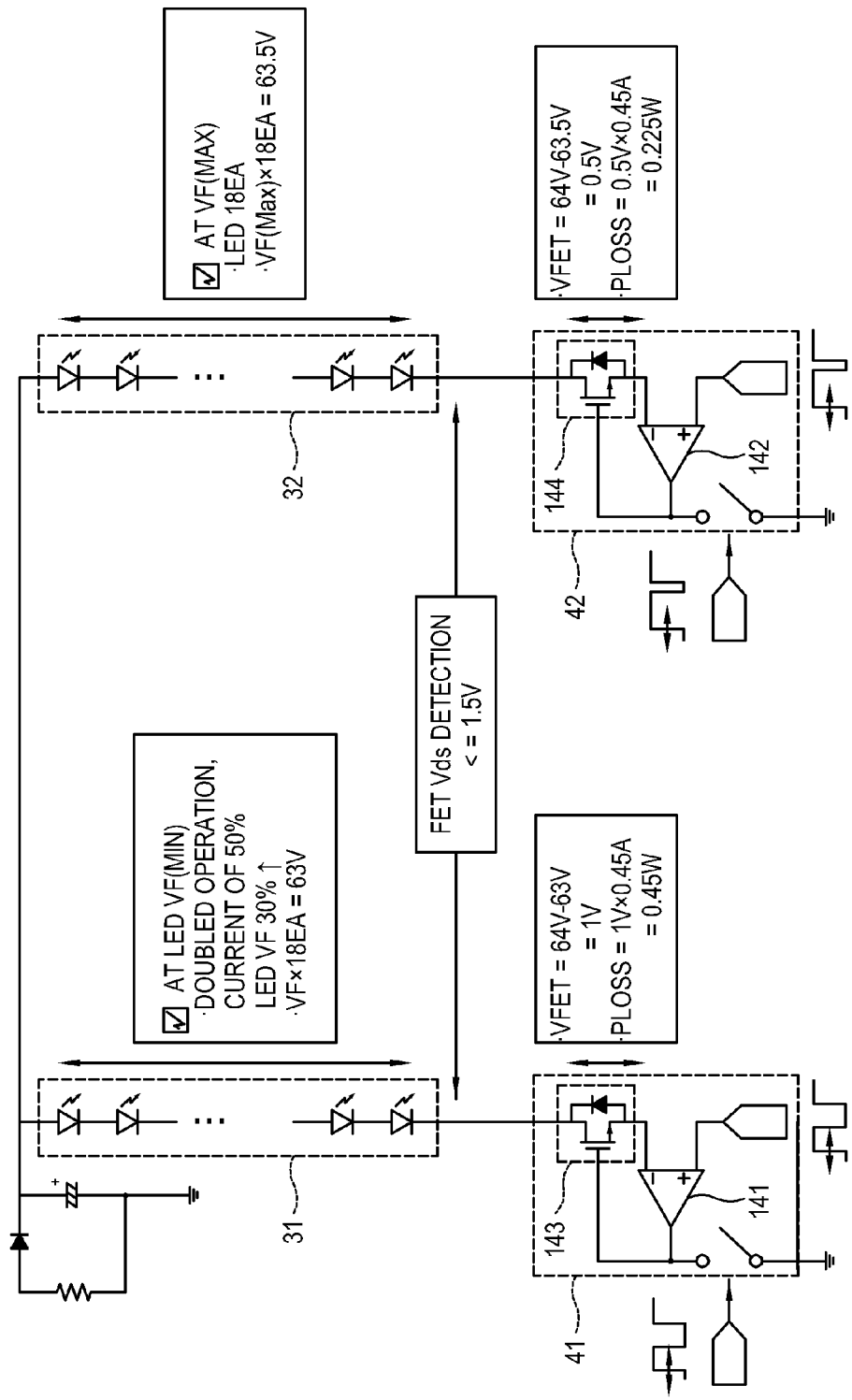
FIG. 4 is a view showing an example where the driving circuit of FIG. 3 is applied to a plurality of LED channels.

If, as illustrated in FIG. 4, a plurality of drivers 41 and 42 are respectively provided for a plurality of LED channels 31 and 32, a single MCU 152 or CPU 151 may control the plurality of drivers 41 and 42, or a plurality of MCUs may be respectively provided corresponding to the plurality of drivers 41 and 42.

Figure 3:
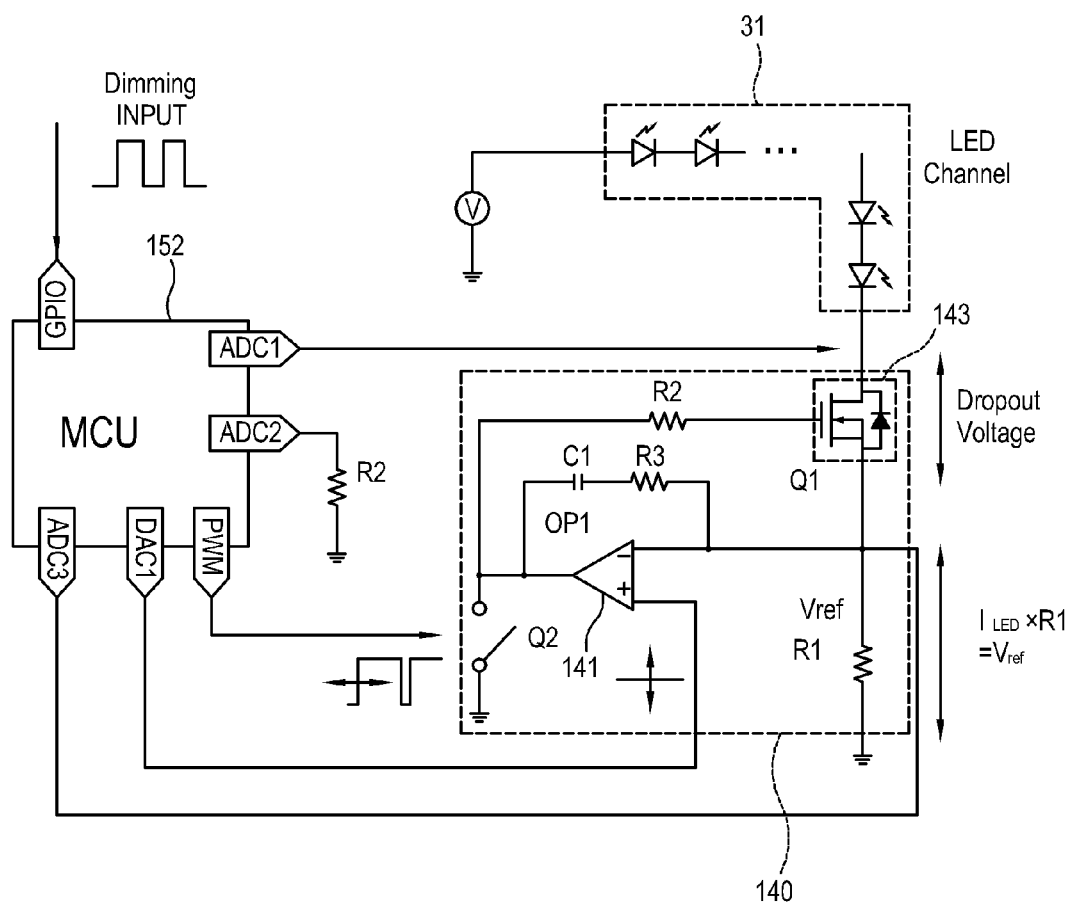
FIG. 3 is a circuit diagram showing the switched linear driver circuitry according to an exemplary embodiment.

FIG. 3 is a circuit diagram illustrating a switched linear driver circuitry according to an exemplary embodiment. The switched linear driver circuitry of FIG. 3 is an example of the light source driving apparatus according to an exemplary embodiment.

As shown in FIG. 3, the switched linear driver circuitry in this exemplary embodiment includes an amplifier OP1 141 for detecting an LED current and generating a constant current control signal, a transistor Q1 143 for adjusting the LED current in accordance with an output voltage of the amplifier OP1 141, and an MCU 152 for detecting the LED current and a dropout voltage of the transistor Q1 143 and controlling the output of the amplifier OP1 141.

Here, the LED current refers to a current flowing in one LED channel 31. The LED channel may include a plurality of LEDs connected in series. FIG. 3 shows an example that the LED current is detected with respect to the LED channel 31, but exemplary embodiments are not limited thereto. If the light source 132 includes the plurality of LED channels, the driving circuit of FIG. 3 may be applied to another LED channel 32.

FIG. 4 illustrates an example where the driving circuit of FIG. 3 is applied to a plurality of LED channels.

Referring back to FIG. 3, as a non-limiting example, the amplifier OP1 141 may be achieved by an operational amplifier (OP-AMP) that detects the LED current flowing in a resistor R1 and generates a constant current control signal through a proportional integral derivative (PID) control.

A gate or base voltage of the transistor Q1 143 is adjusted in accordance with the output voltage of the amplifier OP1 141, and thus the dropout voltage Vdropout is adjusted. The transistor Q1 143 serves to adjust the light source 132, that is, the LED current in accordance with the dropout voltage. In this exemplary embodiment, the transistor Q1 143 may be achieved by a single element of a metal oxide silicon field effect transistor (MOSFET) or a bipolar junction transistor (BJT).

The MCU 152 of the controller 150 monitors the LED current in real time through a terminal ADC3, and monitors the dropout voltage of the transistor Q1 143 through a terminal ADC1.

The MCU 152 applies PWM control to the output of the amplifier OP1 141 in accordance with monitoring results of the LED current, controls a voltage corresponding to the LED current set up based on the monitoring result of the dropout voltage to be supplied to the amplifier OP1 141, and controls the output of the amplifier OP1 141 in accordance with the dimming PWM control signal received from the exterior, that is, the image processor 120.

Here, the MCU 152 controls the transistor Q1 143 by turning on/off the switch Q2, and employs an initial LED current setting value received through a terminal ADC2 as a reference for controlling the LED current.

Specifically, referring to FIG. 3, if a voltage is supplied from a voltage source V to the LED channel 31 including a plurality of LEDs connected in series, the transistor Q1 143 of the driver 140 performs a varying operation as an active mode. Thus, the LED current of the following expression 1 flows via the voltage source V, the LED channel 31, the transistor Q1 143 and the resistor R1.

$$I_{LED}=(V-V\text{dropout}-V\text{ref})/R_{LED} \quad \text{[Expression 1]}$$

where, Vdropout is a dropout voltage of the transistor Q1 143, and Vref is a voltage of the amplifier OP1 141 and becomes a voltage for the resistor R1. The MCU 152 employs the voltage of the LED channel 31 (i.e., the LED voltage) and the voltage of the resistor R1 (Vref), inputs to ADC1 and ADC3, respectively, to monitor the dropout voltage Vdropout. The current flowing in the resistor R1 is input as the LED current to the MCU 152.

The MCU 152 supplies the voltage $V_{LED}$ corresponding to the setting LED current to the amplifier OP1 141 via a terminal DAC1, which generates an output signal of the OP1 141 based on comparison between $V_{LED}$ and Vref. In accordance with the output signal of the OP1 141, the gate voltage of the Q1 143 is adjusted, and the Q1 143 operates like a variable resistor.

If the Q1 143 acts as the variable resistor, Vdropout of the Q1 143 is varied, as shown in the expression 1, and it is therefore possible to apply the constant current control to the current flowing in the LED 31. In this exemplary embodiment, the level of the LED current is adjusted in such a manner that Vref of the OP1 is varied depending on the variation of Vdropout.

In this exemplary embodiment, a mode where the LED current and the dropout voltage of the transistor Q1 are monitored to control the amplifier OP1 141 as described above will be called a linear mode, and a section corresponding to an operation under the linear mode will be called a linear operation section.

If the LEDs having low VF constitute the LED channel 31, the drop voltage Vdropout is greatly increased in the transistor 141, thereby causing a loss of power (PLOSS), based on the expression: Vdropout*ILED=PLOSS.

As shown in FIG. 4, if two or more LED channels 31 and 32 are connected in parallel with a single constant voltage source V, the transistor 143 of the LED channel 31 including the LEDs having the low VF lowers Vdropout (VFET) while maintaining a constant average current, decreases the power loss. On the other hand, the transistor 144 of the LED channel 32 including the LEDs having the high VF maintains the Vdropout (VFET) and the low level of power loss.

Such difference in loss between the LED channels 31 and 32 may cause a problem, and therefore this exemplary embodiment minimizes the difference in the power loss caused by the different VF of the plurality of LED channels.

Figure 5:
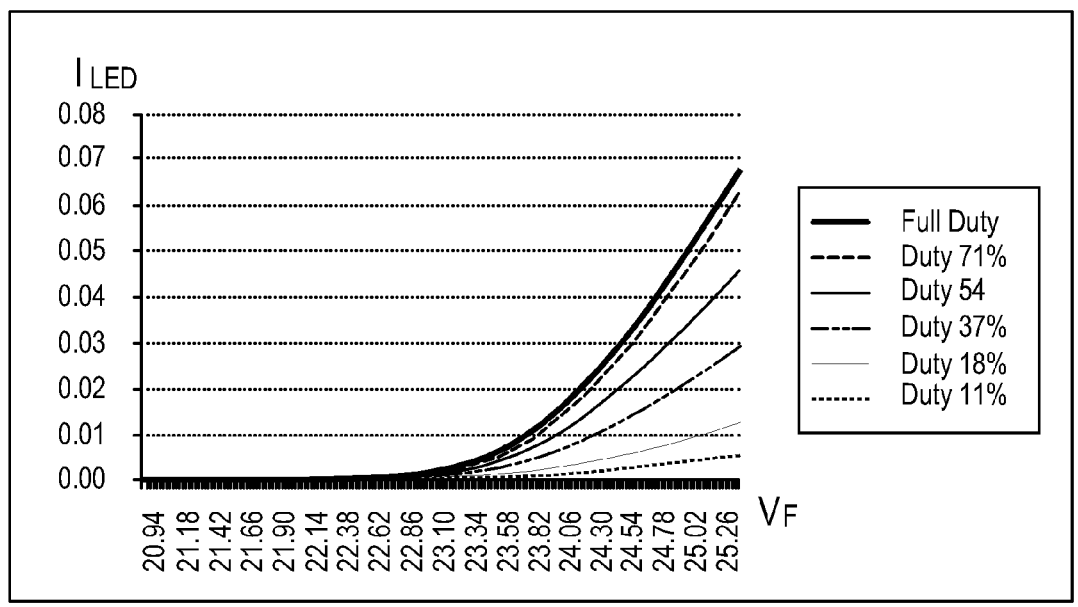
FIG. 5 is a view illustrating a forward voltage drop of an LED in accordance with currents of the LED.
Figure 6:
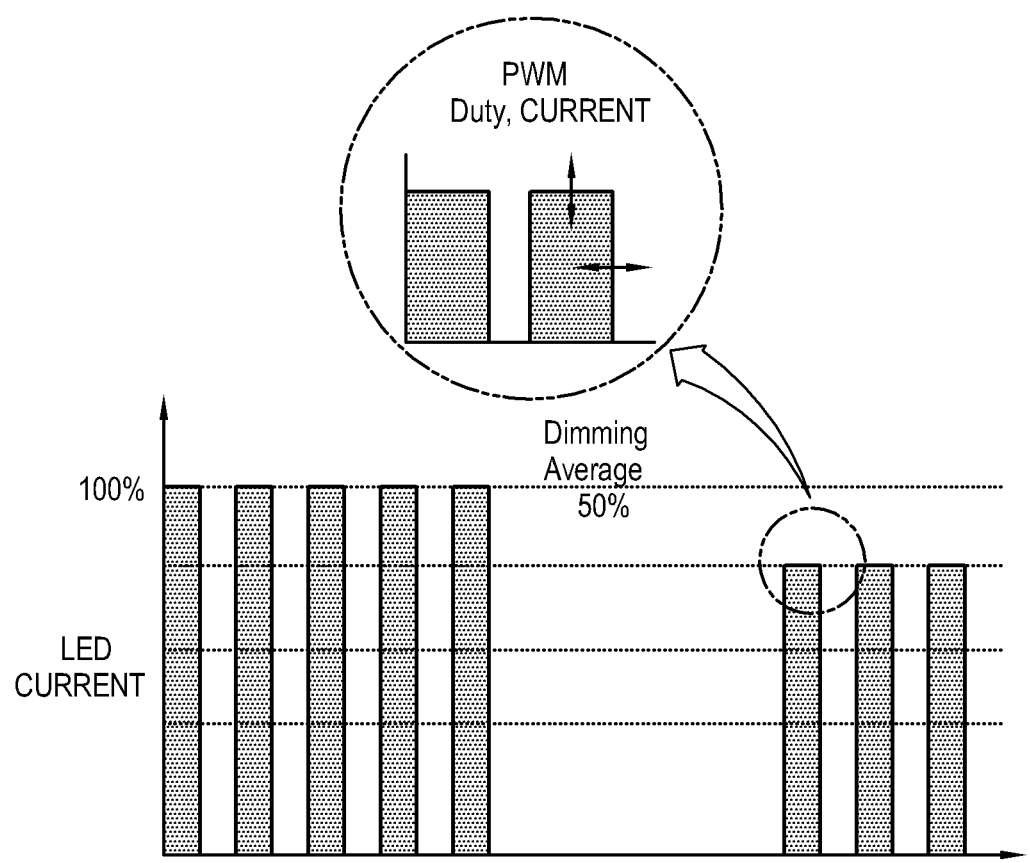
FIG. 6 is a view showing a characteristic of an LED current in accordance with variation in a PWM duty ratio and a current level.

FIG. 5 is a view showing a forward voltage drop, i.e., a VF characteristic of an LED in accordance with currents of the LED, and FIG. 6 is a view showing a characteristic of an LED current in accordance with variation in a PWM duty ratio and a current level.

As shown in FIG. 5, the VF increases as the current increases. In the case of the PWM control, the VF decreases as a duty ratio decreases. Referring to FIG. 6, if the current is controlled by PWM operation, the brightness of the LED is rapidly decreased when the duty ratio is lower than 50% even if the average LED current is maintained.

Figure 7:
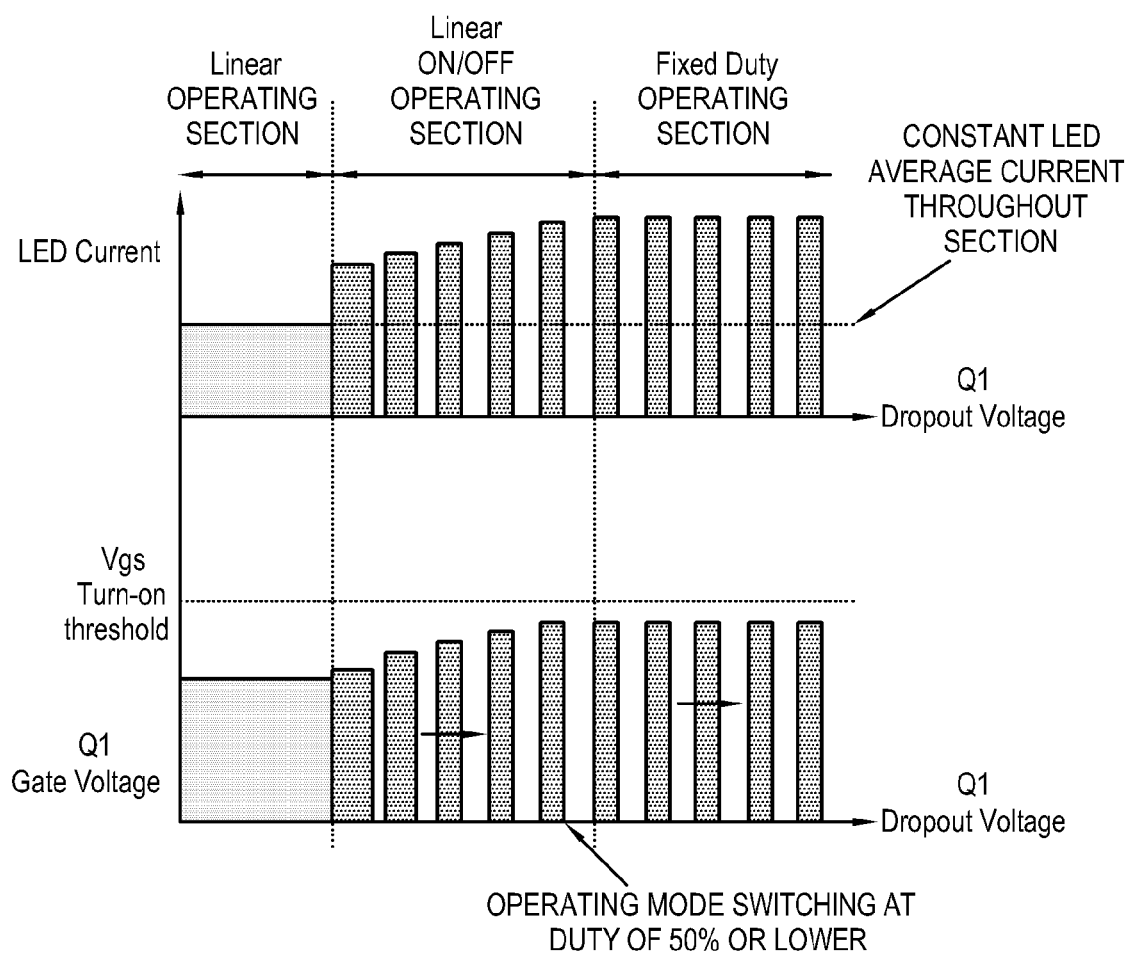
FIG. 7 is a view illustrating an operation mode control of a driver according to an exemplary embodiment.

FIG. 7 is a view for explaining an operation mode control of the driver 140 according to an exemplary embodiment.

In this exemplary embodiment, the operation mode of the driver 140 is controlled with a result based on the MCU 152 real-time monitoring of the dropout voltage of the transistor Q1 141, as shown in FIG. 3.

Specifically, as shown in FIG. 7, the MCU 152 controls the driver 140 to operate in the linear mode if the detected dropout voltage is lower than the reference voltage. Here, the reference voltage is previously set up in consideration of the voltage applied to the LED channel 31 in accordance with the VF, and may, for example, be set respective to a working temperature of the transistor Q 143, such as 1.5V.

In the linear mode, the MCU 152 detects the LED current and the dropout voltage of the transistor Q1 143, and adjusts the output voltage of the amplifier OP1 141 to make the average LED current constant. Specifically, the MCU 152 controls the output voltage of the amplifier OP1 141 so as to flow the LED current corresponding to the voltage set up by the DAC1 of FIG. 2. Here, the transistor Q1 operates in an active mode if it is the BJT, and operates in a Triode region if it is the MOSFET.

The MCU 152 performs the PWM control so as to decrease the PWM duty ratio as shown in FIG. 7 if the dropout voltage of the transistor Q1 143 is equal to or higher than the reference voltage while operating in the linear mode.

In this exemplary embodiment, a mode for adjusting the PWM duty ratio will be called a linear on/off mode, and a section corresponding to the operation under the linear on/off mode will be called a linear on/off section.

Specifically, the MCU 152 performs the PWM control to decrease the duty ratio of the output of the amplifier OP1 141 in such a manner that a switch Q2 is controlled through a PWM terminal. The MCU 152 adjusts the voltage of DAC1, i.e., the gate voltage so that the average current of the LEDs based on the controlled PWM duty ratio can be equal to that of the LED current, that is an average current during the linear section where the constant current is supplied.

Specifically, in the linear on/off mode, the voltage level of the DAC1 is increased to be higher than that of the linear mode under an active mode condition equal to or lower than a gate threshold voltage of the transistor Q1 so as to prevent the transistor Q1 143 from being completely turned on. Further, the voltage of the DAC1 is adjusted according to the PWM duty ratio so that the average current of the LED based on the decreased PWM duty ratio can be equal to the LED current of the linear mode. Therefore, a current corresponding to the voltage of the DAC1 flows at the PWM on, and the LED current is cut off at the PWM off.

Here, if the duty ratio of the LED current is decreased, the current level (i.e., a peak current) increases as shown in FIG. 7, and thus the average current is uniformly maintained during the linear section.

In the linear on/off section, the duty ratio of the transistor Q1 141 is actively decreased as described above, thereby preventing the loss of the transistor Q1 141. That is, the VF of the LED is increased as the duty ratio decreases as shown in FIG. 5, and the voltage applied to the driver 140 is relatively decreased to thereby decrease the power loss of the driver 140.

The MCU 152 does not adjust the duty ratio any more when the duty ratio is equal to or lower than 50% while operating the linear on/off mode, and controls the duty ratio to be fixed.

In this exemplary embodiment, a mode where the PWM duty ratio is fixed will be called a fixed duty mode, and a section corresponding to an operation under the fixed duty ratio mode will be called a fixed duty operating section.

As shown in FIG. 6, when the PWM duty ratio decreases to 50% or lower, the PWM duty ratio is not adjusted anymore and the fixed duty mode starts because the brightness of the LED is rapidly decreased.

During the fixed duty mode, the duty ratio is fixed to 50% if the dropout voltage of the transistor Q1 142 is high, and therefore the brightness is prevented from being lowered even though the PWM duty ratio is decreased up to 50% while operating in the linear on/off mode. Here, the fixed duty ratio is not limited to 50%, but may variously set depending on the characteristics of the LED.

The power loss of the LED driver 140 in the linear mode is determined in accordance with the dropout voltage of Q1 in FIG. 3.

Referring to FIG. 4, in the LED channel 31 including the LEDs having the low VF, the dropout voltage of the transistor 143 is high, thereby causing a problem that the transistor 143 generates heat. In this case, the MCU 152 controls the driver 41 to make the corresponding LED channel 31 enter the linear on/off mode, and perform a corresponding operation.

That is, by increasing the peak current of the LED and decreasing the PWM duty ratio as shown in FIG. 7, the VF of the LED channel 31 such as the characteristic of the LED as shown in FIG. 5 is increased to thereby decrease the dropout voltage applied to the transistor 143 and prevent a temperature of the driver 41 from rising.

Figure 1:
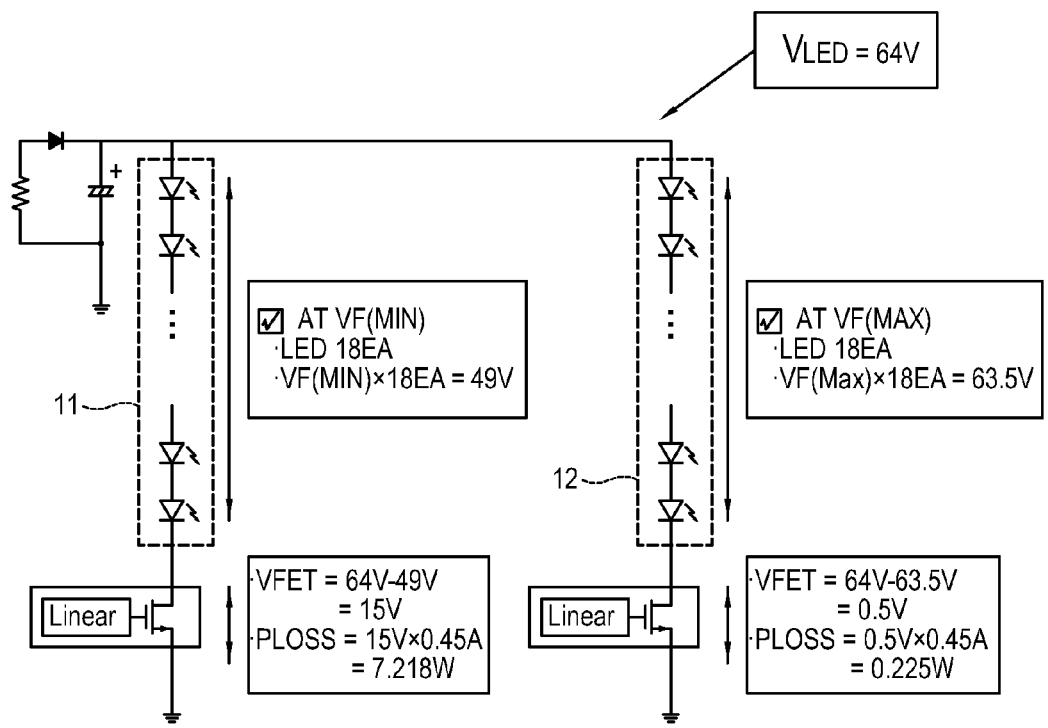
FIG. 1 is a view showing a linear type driver in the related art.

Thus, the plurality of LED channels 31 and 32 as shown in FIG. 4 has the difference in the VF less than VF of the plurality of LED channels 11 and 12 as shown in FIG. 1, and the temperature of the driver 41 is prevented from rising, thereby stabilizing the system of the display apparatus 100.

Below, a driving method of the display apparatus 100 according to an exemplary embodiment will be described with reference to the accompanying drawings.

Figure 8:
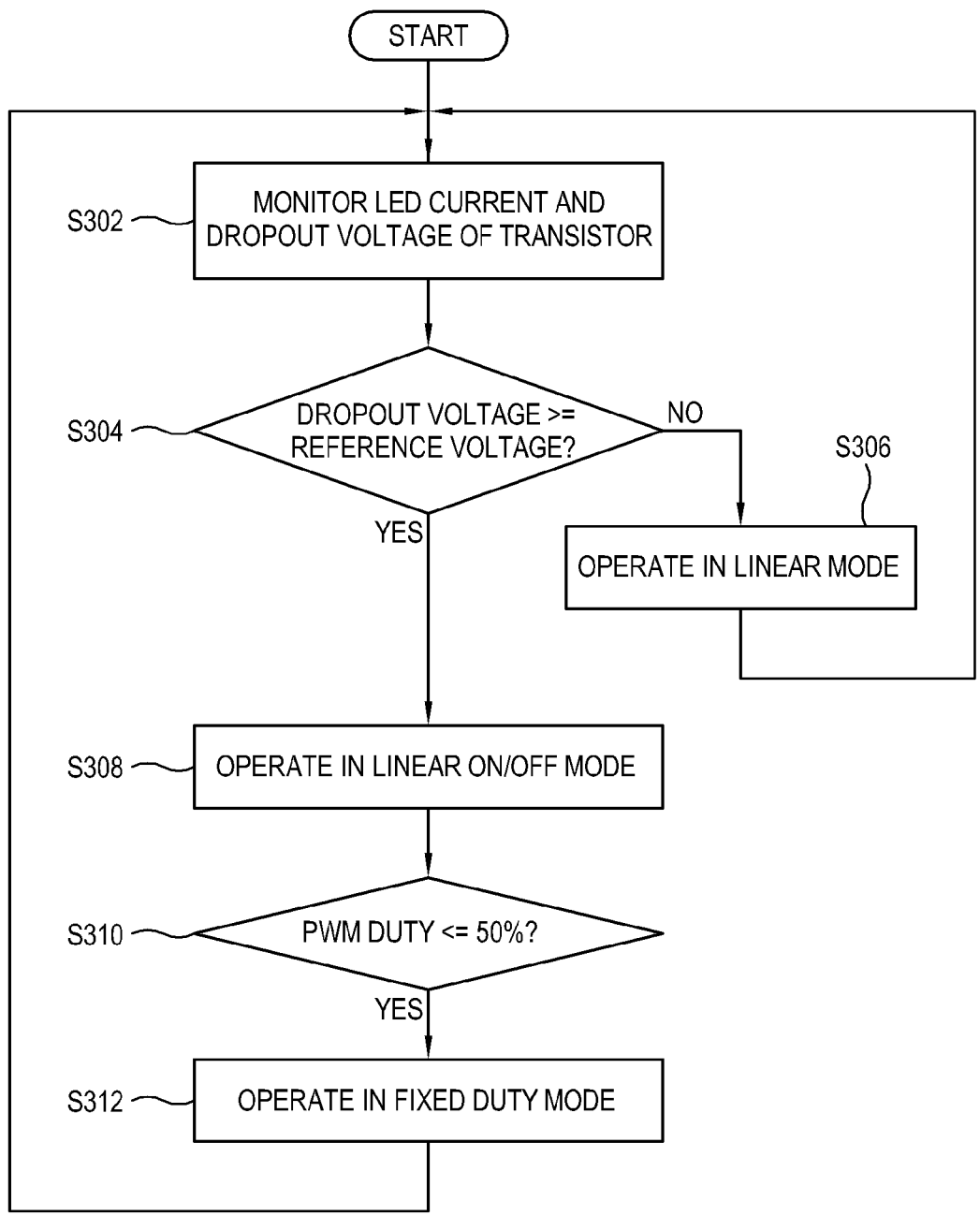
FIG. 8 is a flowchart illustrating a driving method of a display apparatus according to an exemplary embodiment.

FIG. 8 is a flowchart illustrating a driving method of a display apparatus according to an exemplary embodiment.

As shown in FIG. 8, the MCU 152, that is, the controller 150 monitors the LED current flowing in the LED channel 31 of the light source 131 and the dropout voltage Vdropout of the transistor Q1 143 (S302). Here, the driver 41 may be operating in the linear mode.

In accordance with the monitoring result in the operation S302, the controller 150 determines whether the dropout voltage Vdropout of Q1 is equal to or higher than the preset reference voltage (S304).

In the operation S304, if the dropout voltage is lower than the reference voltage, the controller 150 controls the driver 41 to continue operating in the linear mode (S306). Here, in the linear mode, the controller 150 controls the amplifier OP1 141 to monitor the LED current and the dropout voltage of the transistor Q1 143 so that the LED current can become the constant current, thereby adjusting the gate voltage of the transistor Q1 143 to act as a variable resistor.

In the operation S304, if the dropout voltage is equal to or higher than the reference voltage, the controller 150 controls the driver 41 to enter the linear on/off mode (S308). Here, in the linear on/off mode, the amplifier OP1 141 is controlled to decrease the PWM duty ratio, and the gate voltage of Q1 is increased so that the average current of the LEDs based on the adjusted PWM duty ratio can be equal to that of the linear section. Thus, the voltage level and the peak current in the linear on/off mode are increased as compared with those in the linear mode.

The controller 150 detects whether the PWM duty ratio decreases to 50% or lower while the driver 41 is operating in the linear on/off mode (S310).

If it is detected in the operation S310 that the duty ratio is decreased to 50% or lower, the controller 150 controls the driver 41 to enter the fixed duty mode (S312). In the fixed duty mode, the duty ratio is not adjusted any more, and the amplifier OP1 141 is PWM-controlled to operate at the fixed setting duty ratio, for example, at 50%. Here, the gate voltage of Q1 is adjusted so that the average current of the LEDs based on the fixed duty ratio can be equal to those of the linear section and the linear on/off section. Accordingly, the voltage level and the peak current in the fixed duty mode are maintained highly as compared with those in the linear on/off mode.

According to an exemplary embodiment, not separate control software but a simple linear type driver is used to prevent the reliability from decreasing due to the increase of the dropout voltage. In particular, the control of the LED driver and the dimming control are possible with the on/off control based on the dimming signal, and thermal loss due to the difference in the forward voltage drop (VF) between the LED channels is decreased to thereby improve stability and reliability of a product.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display;
   a driver comprising an amplifier configured to detect a current of the display and to generate a constant current control signal, and a transistor configured to adjust the current supplied to the display in accordance with an output voltage of the amplifier; and
   a controller configured to monitor the current of the display and a dropout voltage of the transistor in real time, the monitored dropout voltage varying with a signal output from the amplifier, and, in response to the dropout voltage being equal to or higher than a reference voltage, to control the driver to operate in a linear on/off mode in which a pulse width modulation (PWM) duty ratio of the signal output from the amplifier is adjusted by controlling a switch connected with an output of the amplifier,
   wherein the controller is further configured to control the driver to operate in a fixed duty mode in which the amplifier operates at a fixed PWM duty ratio, if the adjusted PWM duty approaches a predetermined value while the driver is operating in the linear on/off mode.

2. The display apparatus according to claim 1, further comprising an image processor configured to process an image signal corresponding to an image displayed on the display,
   wherein the controller is further configured to control the output voltage of the amplifier in accordance with a dimming PWM control signal received from the image processor.

3. The display apparatus according to claim 1, wherein a gate or base voltage of the transistor is adjusted in accordance with the output voltage of the amplifier.

4. The display apparatus according to claim 1, wherein the controller is further configured to control the driver to operate in a linear mode in which the output voltage of the amplifier is controlled so that a constant current is supplied to the display in response to the dropout voltage being lower than the reference voltage.

5. The display apparatus according to claim 4, wherein the controller is further configured to control a voltage corresponding to a preset current to be supplied to the amplifier based on a monitoring result of the dropout voltage.

6. The display apparatus according to claim 4, wherein the controller is further configured to control the output voltage of the amplifier according to the adjusted PWM duty ratio so that an average current of the display during the linear on/off mode corresponds to an average current of the display during the linear mode.

7. The display apparatus according to claim 1, wherein the controller is further configured to control the driver to operate in the fixed duty mode if the adjusted PWM duty decreases to 50% or lower.

8. The display apparatus according to claim 7, wherein the controller is further configured to control the output voltage of the amplifier according to the fixed PWM duty ratio so that an average current of the display during the fixed duty mode corresponds to an average current of the display during the linear on/off mode.

9. The display apparatus according to claim 1, wherein the display comprises a plurality of LED channels,
   the driver comprises a plurality of drivers corresponding to the plurality of LED channels, and
   the controller is further configured to monitor the current and the dropout voltage in accordance with the plurality of LED channels, and to control a plurality of amplifiers respectively provided in the plurality of drivers.

10. A driving method of a display apparatus comprising a display, and a driver comprising an amplifier configured to detect a current of the display and generate a constant current control signal, and a transistor configured to adjust the current supplied to the display in accordance with an output voltage of the amplifier, the method comprising:
monitoring the current of the display and a dropout voltage of the transistor in real time, the monitored dropout voltage being varied in accordance with a signal output from the amplifier;
controlling the driver to operate in an linear on/off mode by adjusting a pulse width modulation (PWM) duty ratio of the signal output from the amplifier by controlling of turning on or off a switch connected with an output of the amplifier in response to the dropout voltage being equal to or higher than a reference voltage; and
controlling the driver to operate in a fixed duty mode by controlling the amplifier to operate at a fixed setting PWM duty ratio if the adjusted PWM duty approaches to a predetermined value while the driver is operating in the linear on/off mode.

11. The method according to claim 10, wherein the controlling the driver to operate in the linear on/off mode comprises controlling the output voltage of the amplifier in accordance with a received dimming PWM control signal.

12. The method according to claim 10, further comprising adjusting a gate or base voltage of the transistor in accordance with the output voltage of the amplifier.

13. The method according to claim 10, further comprising controlling the driver to operate in a linear mode in which the output voltage of the amplifier is controlled so that a constant current is supplied to the display in response to the dropout voltage being lower than the reference voltage.

14. The method according to claim 13, wherein the controlling the driver to operate in the linear mode comprises controlling a voltage corresponding to a preset current to be supplied to the amplifier based on a monitoring result of the dropout voltage.

15. The method according to claim 13, wherein the controlling the driver to operate in the linear on/off mode comprises controlling the output voltage of the amplifier according to the PWM duty ratio so that an average current of the display during the linear on/off mode section corresponds to an average current of the display during the linear mode section.

16. The method according to claim 10, wherein the predetermined value corresponds to 50% and the controlling the driver to operate in the linear on/off mode comprises controlling the adjusted PWM duty ratio to be fixed if the PWM duty decreases to 50% or lower.

17. The method according to claim 16, wherein the controlling the driver to operate in the linear on/off mode comprises controlling the output voltage of the amplifier according to the fixed PWM duty ratio so that an average current of the display during the fixed duty mode section corresponds to an average current of the display during the linear on/off mode.

18. A light source driving apparatus of a display apparatus comprising a display, the light source driving apparatus comprising:
an amplifier configured to detect a current of the display and generate a constant current control signal;
a transistor configured to adjust the current supplied to the display in accordance with an output voltage of the amplifier; and
a controller configured to monitor the current of the display and a dropout voltage of the transistor in real time, the monitored dropout voltage varying with a signal output from the amplifier, and, in response to the dropout voltage being equal to or higher than a reference voltage, to adjust a pulse width modulation (PWM) duty ratio of the signal output from the amplifier by controlling a switch connected with an output of the amplifier,
wherein the controller is further configured to control the amplifier to operate at a fixed PWM duty ratio if the adjusted PWM duty approaches a predetermined value.

19. The light source driving apparatus according to claim 18, wherein the controller is further configured to control the output voltage of the amplifier in accordance with a received dimming PWM control signal.

20. The light source driving apparatus according to claim 18, wherein the controller is further configured to control the output voltage of the amplifier so that a constant current is supplied to the display in response to the dropout voltage being lower than the reference voltage.

21. The light source driving apparatus according to claim 20, wherein the controller is further configured to control a voltage corresponding to a preset current to be supplied to the amplifier based on a monitoring result of the dropout voltage.

22. The light source driving apparatus according to claim 20, wherein the controller is further configured to control the output voltage of the amplifier according to the adjusted PWM duty ratio so that an average current of the display during a time period for which the constant current is supplied is maintained.

23. The light source driving apparatus according to claim 18, wherein the controller is further configured to control the PWM duty ratio to be fixed if the adjusted PWM duty decreases to 50% or lower.

24. The light source driving apparatus according to claim 23, wherein the controller is further configured to control the output voltage of the amplifier according to the fixed PWM duty ratio so that an average current of a time period during which the PWM duty is adjusted is maintained.

25. A driving apparatus of a primary apparatus, the driving apparatus comprising:
an amplifier configured to detect a current of the primary apparatus and generate a current control signal;
a transistor configured to adjust the current of the primary apparatus in accordance with the current control signal; and
a controller configured to monitor the current of the primary apparatus and a dropout voltage of the transistor in real time, the monitored dropout voltage varying with a signal output from the amplifier, to control a pulse width modulation (PWM) duty ratio of the current control signal by controlling a switch connected with an output of the amplifier, and to control the transistor to adjust, in response to an adjustment of the PWM duty ratio, the current of the primary apparatus in order to maintain a constant average current,
wherein the controller is further configured to control the amplifier to operate at a fixed PWM duty ratio if the adjusted PWM duty approaches a predetermined value.

26. The driving apparatus according to claim 25, wherein the controller is further configured to control the PWM duty ratio to be 100% so that a constant current is supplied to the primary apparatus in response to the dropout voltage being lower than a reference voltage.

27. The driving apparatus according to claim 25, wherein the controller is further configured to control the PWM duty ratio to be less than 100% in response to the dropout voltage being greater than or equal to a reference voltage, and to control the transistor to increase the current of the primary apparatus in order to maintain a constant average current.

* * * * *